United States Patent
Ziegler et al.

(10) Patent No.: US 8,689,049 B2
(45) Date of Patent: Apr. 1, 2014

(54) CORRECTIVE ACTIONS BASED ON PROBABILITIES

(75) Inventors: Michael L Ziegler, Roseville, CA (US); Paymon Ghamami, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 320 days.

(21) Appl. No.: 13/288,782

(22) Filed: Nov. 3, 2011

(65) Prior Publication Data

US 2013/0117605 A1 May 9, 2013

(51) Int. Cl.
*G06F 11/00* (2006.01)

(52) U.S. Cl.
USPC .......................................... 714/15; 714/47.1

(58) Field of Classification Search
USPC .................................. 714/15, 47.1
See application file for complete search history.

(56) References Cited

U.S. PATENT DOCUMENTS

| | | | |
|---|---|---|---|
| 5,968,197 A * | 10/1999 | Doiron | 714/748 |
| 6,839,321 B1 | 1/2005 | Chiruvolu | |
| 7,107,061 B1 | 9/2006 | Tontiruttananon et al. | |
| 7,284,182 B2 * | 10/2007 | Raahemi | 714/758 |
| 2002/0095636 A1 * | 7/2002 | Tatsumi et al. | 714/748 |
| 2004/0133836 A1 * | 7/2004 | Williams | 714/746 |
| 2007/0159965 A1 | 7/2007 | Kopf et al. | |
| 2009/0067335 A1 | 3/2009 | Pelletier et al. | |
| 2010/0202287 A1 | 8/2010 | Diaz et al. | |
| 2011/0214029 A1 * | 9/2011 | Steiner et al. | 714/746 |
| 2012/0131422 A1 * | 5/2012 | Shinbashi et al. | 714/779 |

* cited by examiner

*Primary Examiner* — Charles Ehne
(74) *Attorney, Agent, or Firm* — Preetam B. Pagar

(57) ABSTRACT

Techniques for taking corrective action based on probabilities are provided. Request messages may include a size of a data packet and a stated issue interval. A probability of taking corrective action based on the size of the data packet, the stated issue interval, and a target issue interval may be retrieved. Corrective action may be taken with the retrieved probability.

15 Claims, 13 Drawing Sheets

| TARGET ISSUE INTERVAL | DELAY PER 64 BYTES | EFFECTIVE BANDWIDTH |
|---|---|---|
| 0 | 4 ns | 128 Gbit/sec * |
| 1 | 8 ns | 64 Gbit/sec |
| 2 | 16 ns | 32 Gbit/sec |
| 3 | 32 ns | 16 Gbit/sec ** |
| 4 | 64 ns | 8 Gbit/sec |
| 5 | 128 ns | 4 Gbit/sec |
| 6 | 256 ns | 2 Gbit/sec *** |
| 7 | 512 ns | 1 Gbit/sec |
| 8 | 1024 ns | 500 Mbit/sec |
| 9 | 2048 ns | 250 Mbit/sec |
| 10 | 4096 ns | 125 Mbit/sec |
| 11 | 8192 ns | 62.5 Mbit/sec |
| 12 | 16384 ns | 31.25 Mbit/sec |
| 13 | 32768 ns | 15.63 Mbit/sec |
| 14 | 65536 ns | 7.81 Mbit/sec |
| 15 | 131072 ns | 3.9 Mbit/sec |

\* BASE 100G PORT

\*\* BASE 10G PORT

\*\*\* BASE 1G PORT

FIG. 4

CORRECTIVE ACTIONS BASED ON PROBABILITIES

BACKGROUND

Data networks are used to allow many types of electronic devices to communicate with each other. Typical devices can include computers, servers, mobile devices, game consoles, home entertainment equipment, and many other types of devices. These types of devices generally communicate by encapsulating data that is to be transmitted from one device to another into data packets. The data packets are then sent from a sending device to a receiving device. In all but the simplest of data networks, devices are generally not directly connected to one another.

Instead, networking devices, such as switches and routers, may directly connect to devices, as well as to other networking devices. A network device may receive a data packet from a device at an interface that may be referred to as a port. The network device may then forward the data packet to another port for output to either the desired destination or to another network device for further forwarding toward the destination. The bandwidth available in a network device for such data transfer may be finite, and as such it would be desirable to make such transfers as efficient as possible.

BRIEF DESCRIPTION OF THE DRAWINGS

FIG. 4 depicts an example of Target Issue Intervals.

DETAILED DESCRIPTION

Figure 1:
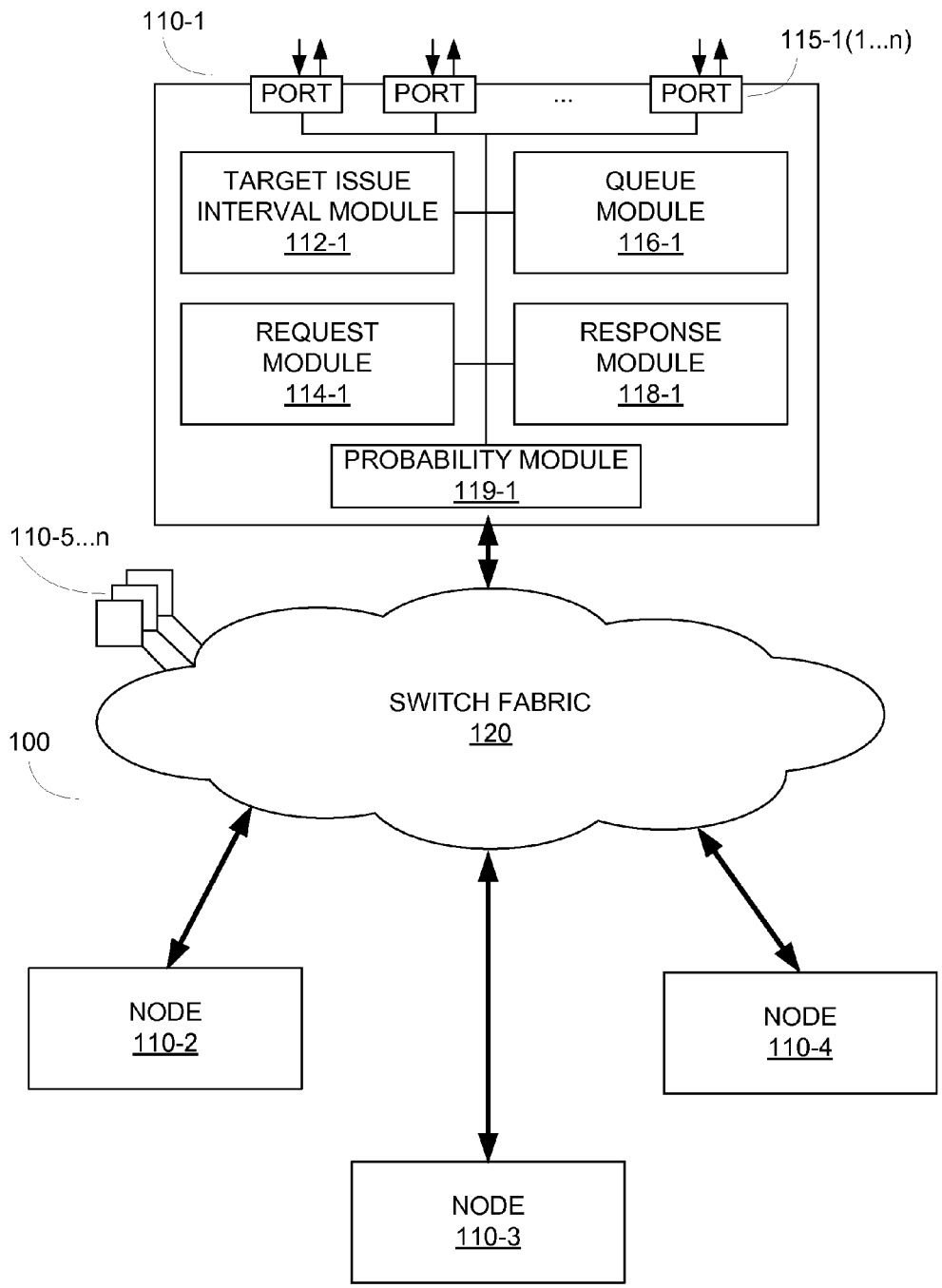
FIG. 1 is a high level block diagram of an example of a network device.

A network device may receive data packets from a plurality of sources and will route those data packets to the desired destination. The network device may receive the data packets through ports that are connected to external packet sources. The network device may then route those data packets to other ports on the network device through a switch fabric. The switch fabric allows for packets to be sent from one port on the network device to a different port. The network device may then output the data packet on a different port.

Each port may operate at a certain data rate. For example, a port may operate at 1 Gbit/sec, 10 Gbit/sec, or 100 Gbit/sec. The data rate at which a port operates determines how fast the port may receive and/or transmit data. Thus, a port with a data rate of 10 Gbit/sec may output data at that rate or below. Data packets may be received from an external source through a port on a source node. The data packets may be organized into streams. For purposes of this description, a stream is a set of data packets that may all be going to the same output port on a destination node. However, it should be understood that each source node may have multiple streams destined for different ports on the same or different destination nodes. Furthermore, a source node may have multiple streams that are destined for the same output port on a destination node. For example, the streams may serve different classes of data packets.

An output port may regulate the rate at which request messages may be sent by a stream in order to prevent the output queue from overflowing. For example, if an output port operates at 10 Gbit/sec and two streams are sending data to that output port at 10 Gbit/sec each, the combined rate of data coming in is 20 Gbit/sec. This rate of input exceeds the rate at which data can be output from the port, thus resulting in a backup at the output port. Each output port may maintain an output queue in which data may be buffered while waiting to be transmitted from the port. However, the buffer size may be finite and if the input rate exceeds the output rate for a long enough period of time, the buffer may become full and eventually overflow.

A source node may send request messages which identify a size of a data packet to be sent to a port on a destination node. Based on the impact to the output buffer of adding a packet of the identified size, the destination node may determine a Target Issue Interval (TII) which may be used to determine the rate at which a stream should offer data packets for addition to the buffer. As the output buffer, also referred to as an output queue, begins to fill, the TII value may be modified such that the streams offer less data. Conversely, as the output queue drains, the TII value may be modified such that the streams offer greater amounts of data.

A problem may arise due to the delay in communicating the TII value to the source node. During the period of time between when an output queue has altered the TII for the queue and the source node has received the updated TII value, the source node may continue to offer data packets at the old TII rate. Because the delay in communicating the new TII value may be significant, data packets may be offered at a rate that exceeds the amount of data that can be held in the output queue. A naïve solution may be to simply refuse offered data packets. However, such a solution may unduly penalize senders that conform to the TII or were offering larger packets. Indiscriminately refusing offered data packets may also unduly penalize senders who are sending at a rate that is less than the desired rate.

The techniques described herein provide for probabilistic correction mechanisms that may overcome the problems caused by delays in communication of the current TII value without the problems of the naïve solution described above. The source node may offer data packets to the output queue at a certain rate, and include that rate when offering the data packet. The output queue may compare the rate at which data packets are being offered to the current TII for the output queue. If the offered rate exceeds the desired rate determined by the TII, the output queue may take corrective action. The taking of corrective action may be based on a probability, such that corrective action is not taken for every offered data packet. The corrective action may include insertion of a delay. The corrective action may include refusal of the offered data packet. The decision to delay or refuse an offered data packet may be based on factors such as the offered rate, the TII, and the size of the data packet.

FIG. 1 is a high level block diagram of an example of a network device. The network device 100, such as a switch or router, may implement the example techniques described herein in order to regulate the rate at which data is sent to an output port. The network device may include a plurality of nodes 110-1 . . . n. For purposes of clarity, only one node is shown in detail in FIG. 1, however it should be understood that there may be any number of nodes. Furthermore, all nodes are capable of both sending and receiving packets, and may be doing so simultaneously. However, for ease of description, FIG. 1 will be described in terms of a destination node 110-1 which may receive data packets from other nodes, referred to as source nodes. The destination node may inform the source nodes of the rate at which data may be sent. The source nodes may respond by conforming the rate at which data is sent to the destination node to the specified rate. It should be understood that in operation, a node may act as both a source node and a destination node at the same time for different data packets or even for the same packet.

A node 110-1 may include a plurality of ports 115-1(1 . . . n). Ports 115-1 may be used to connect to external sources of data packets, such as computers, servers, or even other network devices. The node 110-1 may receive data packets from these external sources through the ports. The node may also send data packets to external devices through the ports. The number of ports that exist on a node may be determined by the design of the network device. For example, in some modular switches, capacity may be added by inserting an additional line card containing 4, 8, 16, or 32 ports. The line card may also contain a node chip to control the data packets sent to and received from the ports. In some cases, depending on the number of ports included on a line card, more than one node chip may be required. However, for purposes of this explanation, a set of ports may be controlled by a single node chip.

The node chip, which may simply be referred to as a node, may typically be implemented in hardware. Due to the processing speed requirements needed in today's networking environment, the node may generally be implemented as an application specific integrated circuit (ASIC). The ASIC may contain memory, general purpose processors, and dedicated control logic. The various modules that are described below may be implemented using any combination of the memory, processors, and logic as needed.

The node 110-1 may include a Target Issue Interval (TII) module 112-1, a request module 114-1, a queue module 116-1, a response module 118-1, and a probability module 119-1. The TII module may be used to maintain a TII value for every output port within the networking device. When a node is acting as a source node, the TII module may be used to determine the TII value currently in effect for an output port. The TII value may be used to determine the rate at which a stream may send data to that output port. Node 110-1 may include a request module 114-1. The request module may be used by a source node to inform a destination node that a data packet is available to be transferred to the destination node. The request module may issue a request message which contains the size of the data packet that is being offered to an output port of a destination node. The request message does not transfer the actual data packet, but rather just informs the destination that a packet is available. At that point, if the destination chooses to accept the request, the data packet may be sent from the source node to the destination node. In some implementations, the source node may initiate sending the data packet, while in other implementations, the destination node initiates the transfer. The techniques described herein are applicable regardless of which node initiates the transfer of the data packet.

Node 110-1 may include a queue module 116-1. The queue module may be used to establish output queues for each port contained on the node. For example, the queues may be implemented as First In First Out (FIFO) queues. As data packets are received by a destination node, the packets may be added to an output queue for eventual transmission out of the network device through one of the output ports. The queue module may also maintain a TII value for each output port on the node based on the depth of the output queue. Node 110-1 may include a response module 118-1. The response module may be used to respond to request messages. The response module may receive a request message and first determine if the request message will be accepted. The response module may send a response indicating if the request message is accepted or refused. Also included in the response message may be an indication of the TII value for the output queue that was the target of the request message. The TII value may be received from the queue module. When a response message is received by a source node, the included TII value may be used to update the TII value stored in the TII module. As will be explained in further detail below, the TII value may determine the rate at which a source node may issue request messages.

Node 110-1 may include a probability module 119-1. The probability module may maintain a list of probabilities for taking corrective action on a request message based on factors such as the TII value and the Stated Issue Interval (SII) value. The SII is the TII that was used by a source node at the time that a request message was sent. If a request message is received by a destination node, and the SII in the request message is less than the determined TII value for the output queue, a probability of taking corrective action may be retrieved from the probability module. Corrective action may then be taken on the request message based on the retrieved probability. Use of the probability module is described in further detail below.

System 100 may also include a switch fabric 120. The switch fabric may receive messages from the nodes and route those messages to their intended destination. Each node may have one or more interfaces to the switch fabric, and it is through the switch fabric that the nodes may communicate with each other.

In operation, data packets may be received by a node, which will be referred to as a source node, for transmission to a destination node, for eventual output on a port of that destination node. A source node may receive packets from external sources through the ports. The source node may organize these packets into streams. For purposes of this description, a stream may be a set of packets that are all destined to be output on the same port of a destination node. However, it should be understood that all data packets from a given source node that are intended for the same output port of a destination node may not all be included in the same stream. A source node may have multiple streams that each contain packets that are to be output on the same port of a destination node. Furthermore, as mentioned above, there may be many source nodes, each containing their own streams. Thus, for a given output port on a destination node there may be streams of packets arriving from different source nodes. Furthermore, there may be multiple streams arriving from the same source node.

When a data packet is available to be sent to an output port of a destination node, the source node may send a request message. Included in the request message may be a size of the data packet. The source node may issue request messages at a rate determined by the TII, which may be retrieved from the TII module. The rate of issuance of request messages may determine the amount of data that is being sent from the stream to a port on the destination node. Also included in the request message may be the Stated Issue Interval (SII). The SII may be the TII that was retrieved from the TII module. As is described below, the TII may change based on responses received from the destination node. The SII is the value of the TII that was used when a particular request message is sent. In other words, the SII provides a history of the value of the TII that was in effect at the time the request message was sent. Use of the TII and SII will be described in further detail below.

Upon receipt of the request message, the destination node may determine the depth of an output queue that is associated with the output port that is the target of the request message should a data packet of the size identified in the request message be added to the output queue. Based on the determination of the resulting depth of the queue, the destination node may determine a TII value for the output port, and include this TII value in a response message returned to the source node that sent the request message. Furthermore, the destination node may determine if the SII included in the request message is less than the determined TII value. If so, the output queue may determine that corrective action is required, with some probability, in order to conform the rate of request messages to the current value of the TII. The determination may be based on the SII, the TII, and the size of the data packet. A probability may be retrieved based on these factors. Corrective action may be based on the retrieved probability. Corrective action may include instructing the source node to insert an additional delay or refusing the request message, which may be communicated to the source node in the response message. The use of probability and the corrective actions will be described in further detail.

Upon receipt of the response message, the source node may update the TII module to reflect the TII value that was communicated in the response message. The source node may further determine if corrective action is needed based on the response message. If corrective action is needed, the source node may institute the corrective action. If no corrective action is required or if the corrective action is a delay, the data packet may be sent from the source node to the destination node. As mentioned above, the transfer of the data packet may be initiated by either the source or the destination node and the techniques described herein are not dependent on which node initiates the data transfer. Once the data packet is received by the destination node, it may be added to an output queue associated with the output port to which the data packet is being sent. If the corrective action is refusal of the request, the source node may resend the request at a later point in time.

Figure 2:
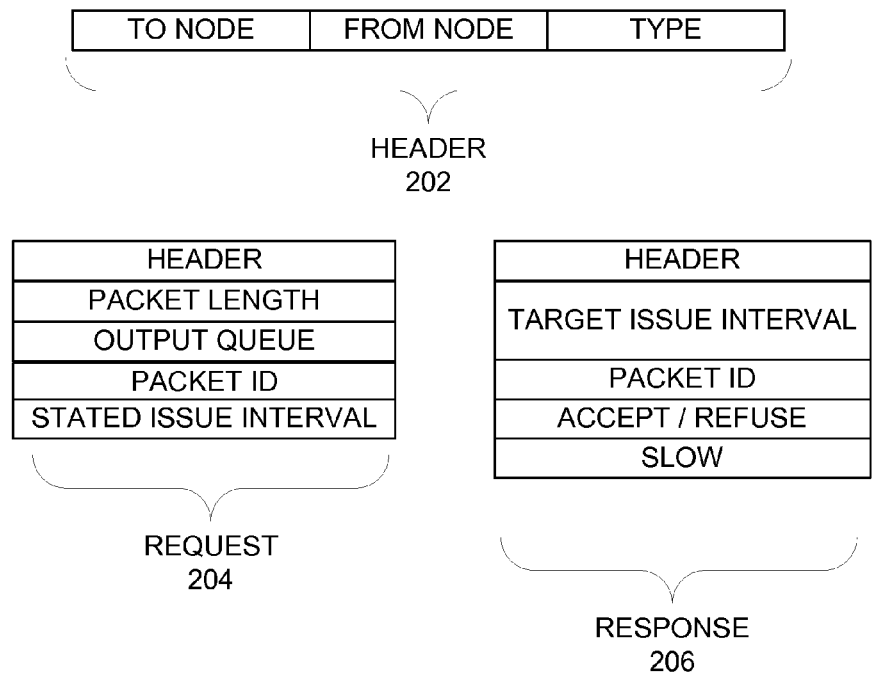
FIG. 2 depicts an example of message content and structure that may be used in an embodiment.

FIG. 2 depicts an example of message content and structure that may be used in an embodiment. The messages described in FIG. 2 are an example of those that may be used with the system as described in FIG. 1. In this example implementation, each message includes a header 202. The header may include a 'To Node' field which identifies the node that the message is intended for. Also included is a 'From Node' field which identifies the node that sent the message. The node identifications may be used by the switching fabric to properly transfer messages from the sending node to the intended recipient node. In addition, the header may also include a 'Type' field which is further used to identify the contents and structure of the message when received.

In the present example implementation there are two basic message types that are used to facilitate the transfer of data packets in a stream from the source node to the destination node. Each message type includes the header 202 which will not be described further. The first message type is the request message 204. The request message may be used by a source node to notify a destination node that a data packet is ready to be transferred from the source node to the destination node. The request message may include a 'Packet Length' field which includes the length of the data packet that is being offered. The request message may include a 'Output Queue' field. The 'Output Queue' field may be used to identify an output queue, which in turn determines an output port, on the destination node to which the data packet is to be added. The request message 204 may also include a 'Packet ID' field to identify the data packet. The use of the 'Packet ID' field will be described below. The request message may also include a 'Stated Issue Interval' field. The 'Stated Issue Interval' field may include the TII value that was retrieved from the TII module at the time a particular request message was sent. The 'Stated Issue Interval' field may be used by a destination node to determine if corrective action may be required.

The second message type is the response message 206. The response message may be used by a destination node to notify the source node that a request message has been received. The response message may include a 'Packet ID' field that identifies the data packet as described with respect to the request message. When the source node receives the response message, the 'Packet ID' field may be used to identify the data packet that is associated with the response. Identifying the data packet in turn identifies the output queue that has sent the response. In some example implementations, the output queue sending the response may be identified in the response message.

The response message may also include a 'Target Issue Interval' field. The 'Target Issue Interval' field may be used by the destination node to inform the source node of the rate of data transfer the output queue desires. The Target Issue Interval will be described in further detail below, however for purposes of description, the TII identifies the rate at which the responding output queue is willing to accept data. The response message may also include an 'Accept/Refuse' field. The 'Accept/Refuse' field may be used by the destination node to inform the source node if the request message associated with a 'Packet ID' is being accepted or refused.

The response message may also include a 'Slow' field. In some cases, the destination node may determine that corrective action is required, as will be described in further detail below. One form of corrective action is to implement a delay. The 'Slow' field may be used by the destination node to inform a source node that a delay should be inserted for the stream that sent the request message associated with the response message, prior to sending another request message.

Figure 3:
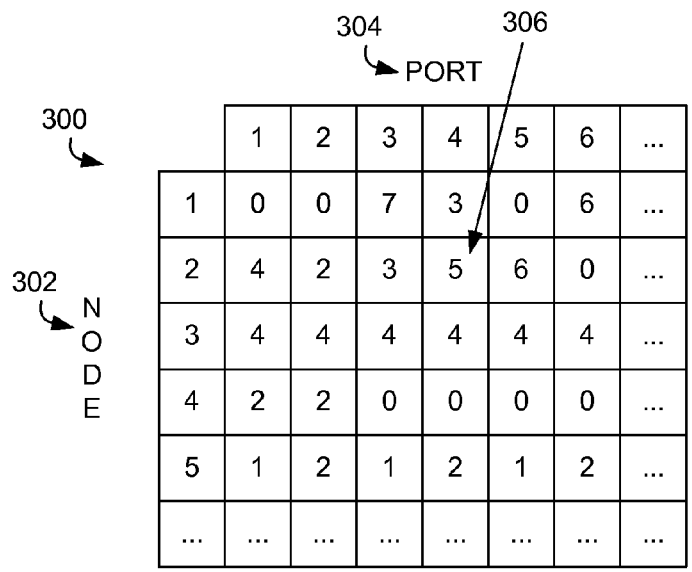
FIG. 3 depicts an example of a Target Issue Interval data structure.

FIG. 3 depicts an example of a Target Issue Interval data structure 300. A TII data structure may be maintained on each node. The TII data structure may be used to store the current TII value for every output port, and hence output queue, within the network device. In the example implementation shown in FIG. 3, the TII data structure is a table. The node axis 302 of the table may identify every possible node in the network device. The port axis 304 may identify every port on each identified node. Thus, the value stored at the intersection of a node and a port may be the TII currently in effect for that particular port on that particular node. For example, TII 306 may identify the TII for the fourth port on the second node as currently being the value 5. The various values of the TII will be described in further detail below.

The TII data structure may be maintained by the TII module 112. Whenever a response message, such as a response message 206 described above, is received, the TII value may be extracted from the response and the value added to the TII data structure. It should be understood that the TII data structure may be updated upon every response, regardless of the stream that sent the request that resulted in the response. As explained above, multiple streams on a source node may be sending data packets to a single output queue. As such, each stream will issue separate requests and receive separate responses. However, updating of the TII table is independent of the streams. Whenever a response message containing a TII is received, the TII data structure may be updated.

FIG. 4 depicts an example of Target Issue Intervals (TII). As mentioned above, the TII determines the rate at which a stream may send request messages to an output queue. The TII may determine the rate at which a stream is expected to send data to an output queue. The TII may be represented as a delay normalized to a defined number of bytes, such that the amount of data offered by a stream remains approximately the same, regardless of the size of the data packets within the stream. This normalization allows for a bandwidth fair allocation of available bandwidth. The bandwidth fair allocation will be described in further detail below.

In some example implementations, the correspondence between the TII values and the delay may be determined at design time. In other example implementations, the correspondence may be configurable parameters that are set by a system administrator when configuring the network device. Although shown as a table, it should be understood that any other data structure may be used. Regardless of how the values are set or in what type of structure the values are stored, every node within the networking device may maintain the information regarding TII values.

For each TII value 410, there may be an associated per byte delay 420. As shown in FIG. 4, the per byte delay may be specified for a certain number of bytes, such as 64 bytes. For every 64 bytes of data in a packet for which a request was sent, the stream may delay the number of seconds specified before sending another request message. For example, if a stream has sent a request message for a 64 byte packet and the current TII interval for the output queue (as determined by a data structure such as the one depicted in FIG. 3) is set to a value, the stream will delay the determined number of seconds before sending a subsequent request message. Each TII value may be associated with an effective bandwidth 430. For example row 440 in FIG. 4 specifies that a TII value of 4 results in a 64 nanosecond (ns) delay before sending the next request message. If a stream is sending 64 byte packets, the stream will delay 64 ns between each subsequent request. In other words, the stream is offering data packets at a rate of 1 packet per 64 ns, which results in an effective bandwidth of 8 Gbit/sec.

In a case where larger data packets are being sent, the delay may be greater. For example, if a stream is sending data packets that are 2 Kilobytes (Kbyte) long, there will be a delay of 16,384 ns between request messages, given the same TII value of 4 described above. The reason for this is that a 2 Kbyte packet, when divided by 64 bytes, comes out to 32. Because the stream inserts a delay per 64 bytes, the stream will insert a delay of 32*64 ns=16,384 ns between requests. In other words, the stream is offering data packets at a rate of 1 packet per 16,384 ns, which again results in an effective bandwidth of 8 Gbit/sec. The bandwidth fair aspects of the TII are described in further detail below.

The TII table may also maintain base TII values for each type of output queue. As mentioned above, output ports, and their corresponding output queues, may operate at various data rates. Some example output rates include 1 Gbit/sec, 10 Gbit/sec, and 100 Gbit/sec. The TII values determine the rate at which a stream may send request messages, and thus data, to an output queue. However, it may not be desirable to allow a stream to send data to an output queue at a rate that greatly exceeds that which can be supported for extended periods of time. For example, if an output queue is operating at 1 Gbit/sec, it may be desirable to limit the input to that queue to 2 Gbit/sec or less. Although a 2 Gbit/sec rate exceeds the capacity of the output queue, allowing such a rate for a period of time may allow for sufficient data to be added to the queue, thus ensuring the output queue is not starved for data. Although the techniques described herein are able to handle such an inrush of data without these limits, it may be desirable to address this case prior to it occurring.

For each data rate supported by an output queue, there may be specified a base TII value. As shown, base TII values have been specified for 1 G 450, 10 G 460, and 100 G 470 ports. The system may limit an output queue to TII values that are at or above the base value. For example, an output queue operating at 10 Gbit/sec may be limited to TII values of 3 or above. As such, the output queue may only request data at a rate of 16 Gbit/sec or below. Such a restriction may be useful because it may be more efficient to restrict an output queue to a data rate close to that which it may actually have a chance of supporting. However, it should be understood that the techniques described herein are not dependent on, and are capable of operating without, the base TII values.

FIGS. 5(*a-b*) depict an example of probability data structures. As mentioned above, a destination node may need to take corrective action based on a request message. The request message may include a size of a data packet and a Stated Issue Interval, which is the TII that was in effect at the time the request message was sent. Based on these two factors, plus the TII that is currently in effect for the output queue that is the target of the request message, the destination node may retrieve a probability of correction from a data structure such as the ones depicted in FIGS. 5(*a-b*). The data structure may also include the type of correction that may be taken.

FIG. 5(*a*) depicts a data structure in the form of a two dimensional table. On one axis may be the difference between the SII contained in the request message and the TII currently in effect for the output queue 510. As mentioned above, the SII value may be retrieved from the request message and the TII is known by the destination node. On the other axis may be the size of the data packet 520. The size of the data packet may be retrieved from the request message. Although it may be possible to have an entry in the table for each possible packet size, in some implementations it may be more efficient to aggregate different packet sizes into groups of a fixed size. For example, rather than have 64 different entries for packet sizes ranging from 64 to 127 bytes, it may be more efficient to aggregate the packet sizes. Thus, all packets ranging from 64-127 bytes may correspond to a single point on the packet size axis. In some example implementations, the aggregation may use an exponential scale. For example, packet sizes up to 64 bytes, 128 bytes, 256 bytes, 512 bytes, and so on may be each be represented by a point on the packet size axis. The specific level of aggregation used may be determined based on factors such as the desired size of the table or the granularity desired for making corrections to request messages.

At the intersection of the difference between SII and TII and the size of the data packet may be stored a tuple indicating the probability of correction and the type of correction. For example, as shown, at the intersection of a difference in interval values of 3, with a packet size falling within the 1024 Byte range, a tuple 530 may be specified. The tuple may include a probability 532. The probability may be the probability that corrective action should be taken on a given request message. As shown, a probability of 0.05 may indicate that corrective action may be taken with a probability of 5/100. A random number between 0 and 1 may be generated by a destination node. If the random number is less than the probability specified in the tuple, corrective action may be taken.

The tuple may also include an indication of the type of corrective action that is to be taken. As will be described in further detail below, the techniques described herein provide for two types of corrective action. The first type is to instruct the source node to insert a delay. The second type is to refuse the request message. The tuple may include a delay indication, such as a delay flag 534. If the delay indication indicates that the corrective action may be a delay, the flag may be set to true. Otherwise, the corrective action may be a refusal, and the delay flag may be set to false. In short, the probability stored in the tuple determines if corrective action is to be taken on a request message, while the delay indication determines if that corrective action is to be a delay. Otherwise, the corrective action may be a refusal.

Figure 5A:
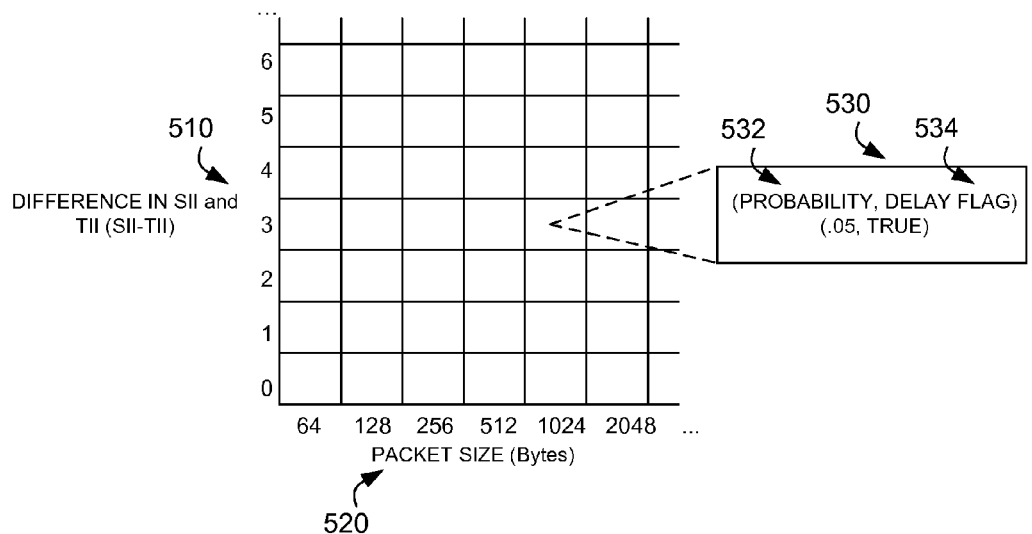
FIGS. 5(a-b) depict an example of probability data structures.
Figure 5B:
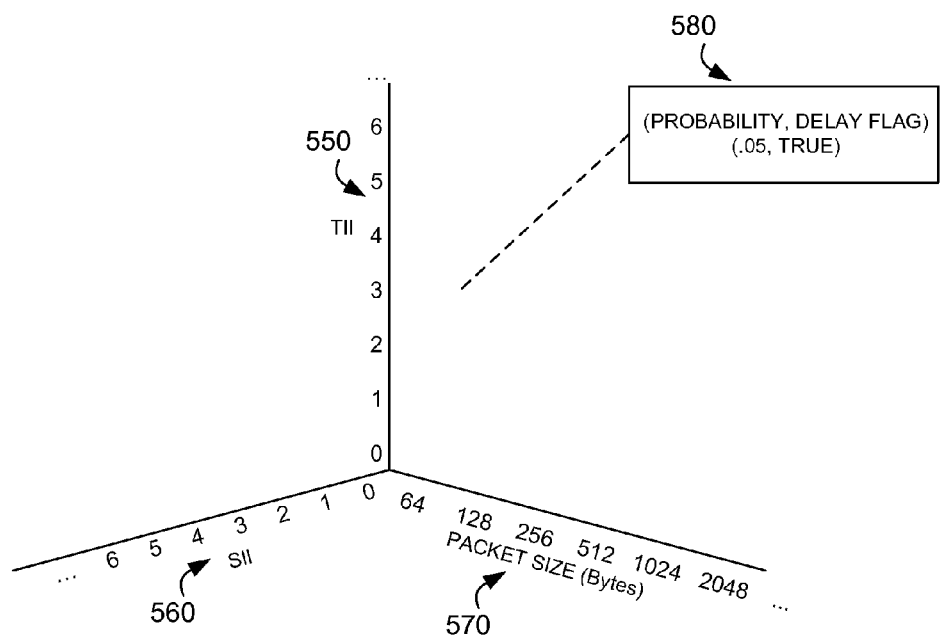

FIG. 5(b) depicts a probability data structure 550 that is similar to that shown in FIG. 5(a). However, rather than using a difference between the SII and the TII, these values are independently reflected in the structure. For example, one axis 560 may include all possible SII values while the other axis 550 includes all possible TII values. A third axis 570 may include the packet sizes as was described above. A request message may include the SII and the packet size and the destination node is aware of the TII for the output queue. Thus, for a request message, a tuple 580 within the structure shown in FIG. 5(b) may be retrieved. Just as above, the tuple may indicate the probability of taking any corrective action, and the type of corrective action to take.

Although FIG. 5 was described as two and three dimensional tables, this was for purposes of ease of description. It should be understood that any type of data structure that is able to convey the probability of correction and correction type given a SII, TII, and packet size may also be used. Use of the data structures depicted in FIG. 5 will be described in further detail below.

Figure 6:
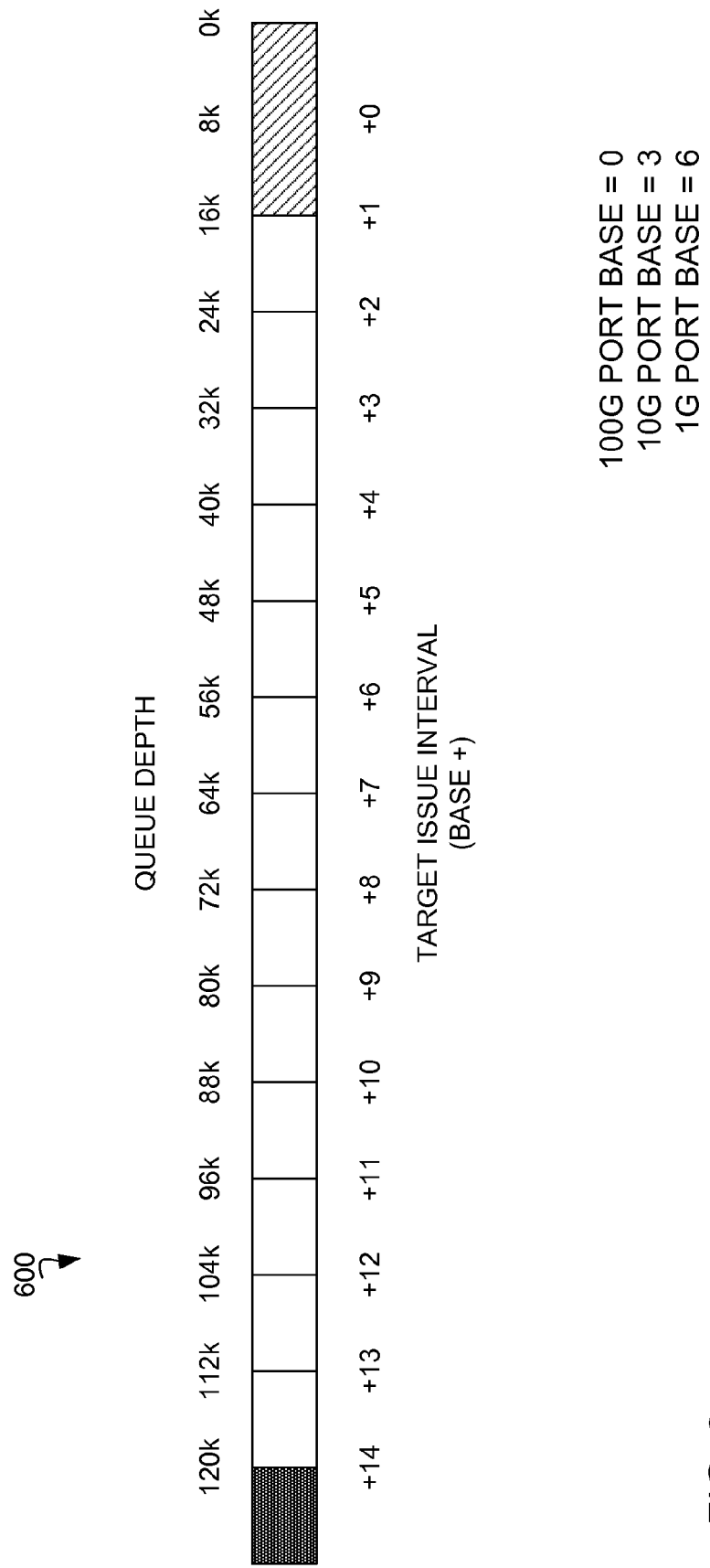
FIG. 6 depicts an example of an output queue.

FIG. 6 depicts an example of an output queue. As mentioned above, every output port on a destination node may be associated with an output queue 600. As packets are received by the destination node, the packets may eventually be placed in an output queue for transmission out of the networking device. The queue may be implemented as a first in first out (FIFO) queue. Although the output queue shown in FIG. 6 is depicted as a single, contiguous region of memory, it should be understood that this is only an example implementation. In other example implementations, the output queue may be distributed to non-contiguous regions of memory. For example, in some example implementations, the output queue may be implemented as a linked list, with the links maintaining the FIFO nature of the queue.

Regardless of implementation, at any given time, an output queue may have a depth. The depth of the output queue indicates how much of the available storage space within the queue is currently in use. The sizes of the data packets within the output queue are not important, but rather what should be noted is that the depth indicates the total amount of the queue that is currently in use. The output queue may be divided up into several segments. As shown, the output queue may be divided into segments of 8 Kbyte, however this particular segmentation is for purposes of description only. The actual determination of the segmentation may be a parameter that is configured by a system administrator when configuring the networking device.

Assigned to some of the segments may be Target Issue Interval values. In some implementations, the TII values are assigned as increments over the base rate for the output queue, as was described above. As shown, beginning with the segment beginning at a queue depth of 16 Kbyte, a TII value of +1 is assigned. Thus, at a queue depth of 16 Kbyte a TII value of the base rate+1 may be assigned to that transition point. Likewise, there may be transition points for TII values corresponding with each of the defined segments.

In operation, a queue may initially be empty, and thus have a depth of 0 Kbyte. As request messages are received and accepted, space equivalent to the identified size of a packet in the request message is allocated for the eventual receipt of the data packet. This allocated space is thus considered in use by the output queue because it will be used once the data packet arrives and is added to the queue. If request messages are accepted and space allocated at a rate faster than data packets within the queue can be transmitted from the output port and free up space within the queue, the queue depth will begin to grow. The reason for this is that more space within the queue is being allocated for receipt of data packets than space is being made available by data packets leaving the queue. Up to a certain threshold, such queue growth is not an issue, and may in fact be desirable as it ensures that the output queue may not be starved for data to be transmitted. Until the queue depth exceeds this threshold, no regulation may be required. As shown, up to the 16 Kbyte point, any growth in the output queue may be considered acceptable, and as such the input streams may not be limited in the amount of data that can be offered (to the extent that the base rate allows). However, at a certain point, it may be determined that the depth of the output queue is larger than desired to maintain a sufficient backlog of data to be output. Once a sufficient level of backlog has been achieved, and thus the regulation threshold crossed, the rate of growth may be limited. For purposes of the remainder of the description of FIG. 6, it is assumed that the output port is a 100 G port, and thus the base value is zero.

As shown, at the 16 Kbyte transition point, a TII value of one has been assigned. If the queue depth crosses this transition point, the TII value that may be sent in the response messages for this output queue may indicate that the TII value for the output queue is one. When a source node receives the value in the response message, the source node may update the current TII table to reflect the value of the TII. As the queue depth increases, additional transition points with a greater TII value may be crossed, and thus a higher value of a TII may be reported to the source node. Likewise, as the depth of the queue decreases, transition points with a lower TII value are crossed, and a correspondingly lower TII value may be reported. As mentioned above, and will be described in further detail below, the TII value determines the rate that streams are allowed to send data packets to the output queue.

As shown in FIG. 6, at some threshold, the queue may reach a point where the depth can no longer increase. For example, an actual implementation of an output queue cannot have an infinite depth, as there cannot be an allocation of an infinite amount of memory for the queue. Thus, an output queue may be capped at a maximum depth, which may correspond to the maximum amount of memory that has been allocated for the output queue. As shown in FIG. 6, the output queue may have been limited to a maximum depth of 128 Kbyte. At a point just prior to this maximum depth, for example 120 Kbyte, the TII interval may be selected to be sufficiently high to allow for the output queue to drain. Should the output queue grow to a depth where additional request messages cannot be accepted because there is no space available in the output queue, the response message may indicate that the request is being refused and the data packet is not sent to the destination node. Once the depth of the output queue has passed the refuse all requests threshold, all request messages may be refused.

Figure 7A:
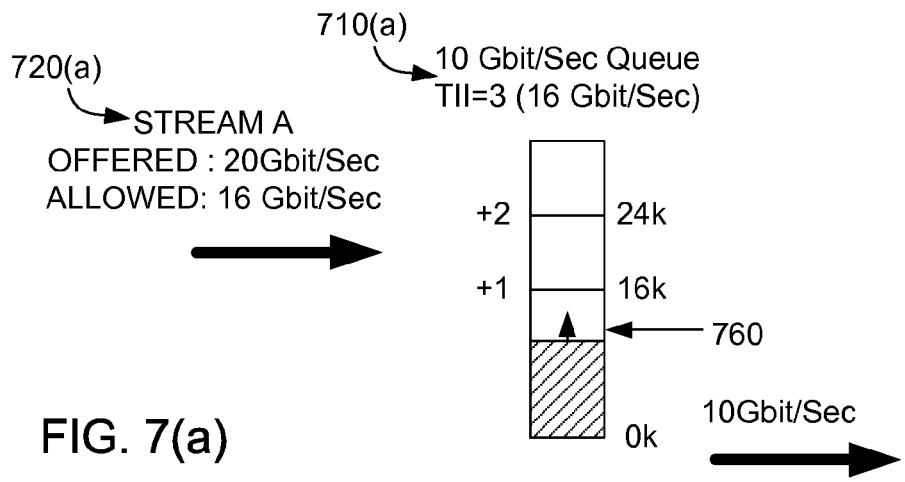
FIGS. 7(a-c) depict an example of output queue stabilization.

FIGS. 7(a-c) depict an example of output queue stabilization. Shown in FIG. 7(a) is a 10 Gbit/sec output queue 710(a). As described above, a 10 Gbit/sec output queue may initially limit the amount of traffic it may request to more closely conform with the output capabilities of its associated I/O port. As such, the TII for the output queue may be set to 3, which corresponds to an effective bandwidth of 16 Gbit/sec. Also shown is stream A 720(a) which has data to offer at a rate of 20 Gbit/sec. Because the initial TII is set to 3, the amount of traffic allowed will be limited to 16 Gbit/sec. Stream A may begin sending request messages to the output queue with an effective bandwidth of 16 Gbit/sec. Because the output queue 710 is a 10 Gbit/sec queue, the depth of the queue may begin to climb 760. The reason for this is that traffic may be coming into the queue at a rate of 16 Gbit/sec but can only leave the queue at a 10 Gbit/sec rate.

Figure 7B:
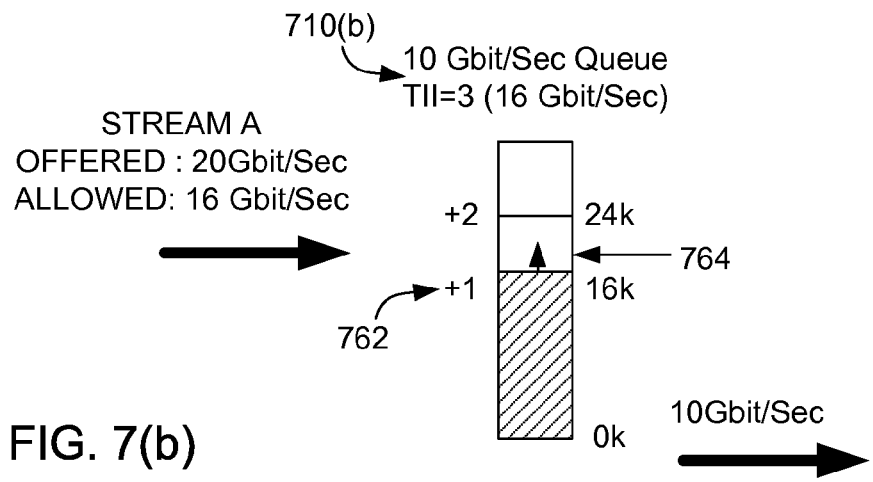
Figure 7C:
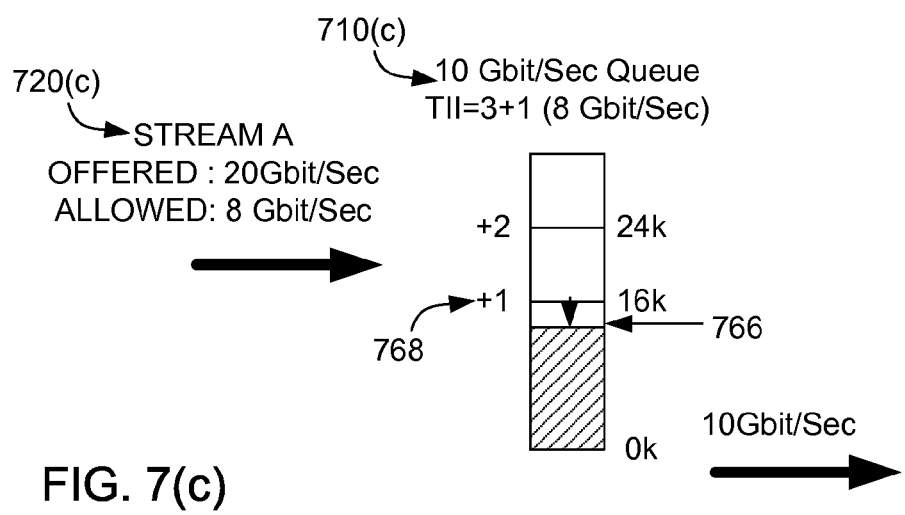

As the depth of the output queue continues to increase, at some point the depth will cross a boundary where the TII is changed. As shown in FIG. 7(b), at a queue depth 710(b) of 16 Kbyte, the TII is to be increased by one 762. However, due to the delay in communicating the TII back to stream A, the stream may continue to issue requests at the higher rate for a period of time, causing the queue to further increase in depth 764. As shown in FIG. 7(c), the new TII of 3+1 may be received by the sending node. Stream A 720(c) may then reduce the rate of request messages resulting in an allowed effective bandwidth of 8 Gbit/sec, which corresponds to a TII of value 4. As such, the output queue 710(c) may begin to decrease 766. The reason for this is that data may now be coming in at a rate of 8 Gbit/sec but is leaving the queue at a rate of 10 Gbit/sec.

At some point, the queue depth will again drop below a TII transition point. As shown, the depth of the output queue may eventually drop below the transition point at 16 Kbyte 768. As such, output queue may return to the initial TII value of 3 which may allow data at a rate of 16 Gbit/sec again. As such, the queue will begin to grow in depth again, as was shown in FIG. 7(a). The depth of the output queue will thus stabilize at around the 16 Kbyte point by dithering about that point. As such, the output queue has thus been stabilized.

Figure 8A:
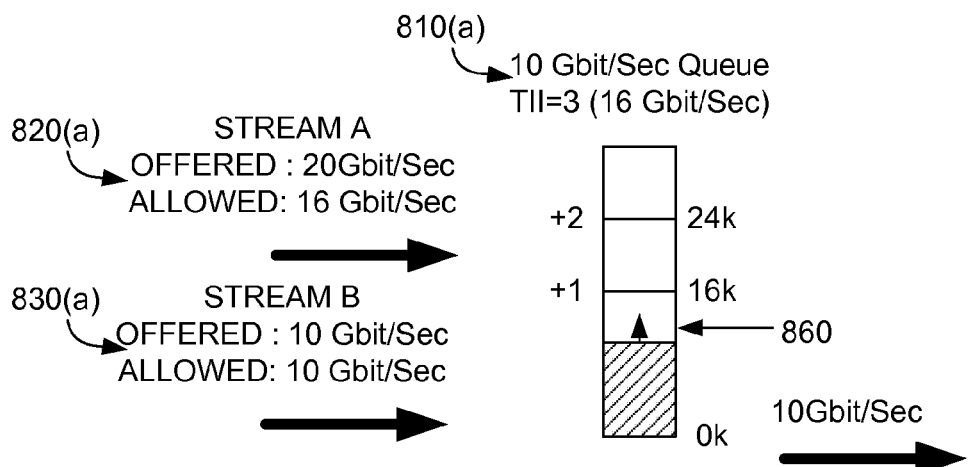
FIGS. 8(a-c) depict another example of output queue stabilization.

FIGS. 8(a-c) depict another example of output queue stabilization. FIG. 8 may be thought of as a continuation of FIG. 7, with the addition of a second stream. Just as above, output queue 810(a) may operate at 10 Gbit/sec, with an initial TII of 3, resulting in communication of an allowed bandwidth of 16 Gbit/Sec. Stream A 720(a) may again be a 20 Gbit/sec stream, which is limited to 16 Gbit/sec by the TII of 3 currently in effect. Stream B 730(a) may be a 10 Gbit/sec stream. Because the current value of the TII allows traffic at a 16 Gbit/sec rate, and stream B is only offering 10 Gbit/sec of traffic, stream B is initially unrestricted. The queue depth of the output queue may begin to increase 860. The reason for this is that the combined rate of data coming into the output queue from both streams is 26 Gbit/sec, while the queue is draining at a rate of 10 Gbit/sec.

Figure 8B:
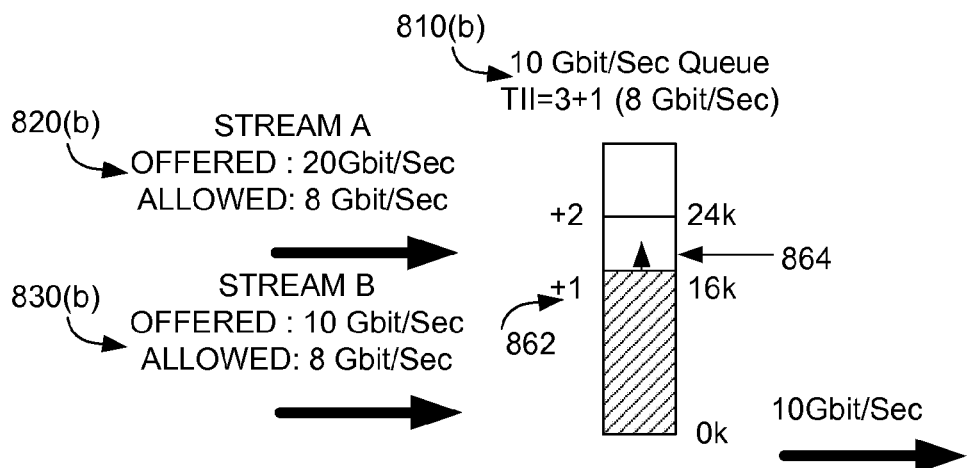

As the depth of the output queue continues to increase, at some point the depth will cross a boundary where the TII is changed. As shown in FIG. 8(b), at a queue depth 810(b) of 16 Kbyte, the TII is to be increased by one 862. The new TII may be communicated back to Stream A 820(b) and Stream B 830(b). As such, both of the streams may reduce the rate of traffic being sent to the output queue to 8 Gbit/sec from each stream, in accordance with a TII value of 4. However, even at the reduced rate, the combined traffic is still 16 Gbit/sec, which is greater than the 10 Gbit/sec output rate of the output queue 810(b). As such, the depth of the queue may continue to rise 864, albeit at a slower rate than before.

Figure 8C:
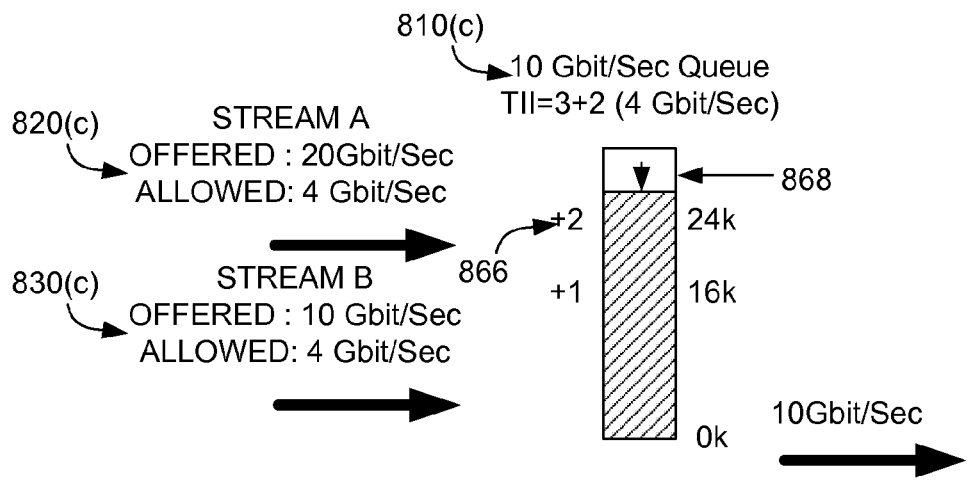

As the depth of the output queue continues to increase, at some point the depth will cross the next boundary where the TII is changed. As shown in FIG. 8(c), at a queue depth of 24 Kbyte, the TII value is two 866. Thus, a value of two may be added to the base value, resulting in a value of 5. Output queue 810(c) may then communicate the new TII value of 5, which corresponds to a data rate of 4 Gbit/sec to Stream A 720(c) and Stream B 720(c). Those streams may then reduce the rate at which data is sent to 4 Gibt/sec each, resulting in a combined rate of traffic of 8 Gbit/sec. Because the output queue 810(c) is draining at a rate of 10 Gbit/sec and the traffic is coming in at a rate of 8 Gbit/sec, the depth of the output queue will begin to drop 868. Just as above, the queue depth will continue to drop until the transition point 866 at 24 Kbyte is passed. The TII may then be reduced to again allow traffic at the 8 Gbit/sec rate, which was described in FIG. 8(b). The depth of the output queue will thus stabilize at around the 24 Kbyte point by dithering about that point. As such, the output queue has thus been stabilized.

Although only two streams are shown in FIG. 8, the techniques described herein are applicable regardless of the number of streams. The TII value may be determined based on the depth of the output queue, regardless of how many streams are sending data packets. If additional streams were to begin sending data packets to the output queue, the depth would again begin to increase, resulting in a higher TII value and hence further limiting the rate at which each stream may send data. Likewise, if a stream discontinues sending data to the output queue, the queue depth may begin to decrease, resulting in a lower TII value, which in turn will allow the remaining streams to send data at a higher rate. Furthermore, it should be noted that the size of the packets being sent by each stream is not relevant. As was explained with respect to FIG. 5, the techniques described herein ensure a fair distribution of the available bandwidth to all participating streams.

Figure 9A:
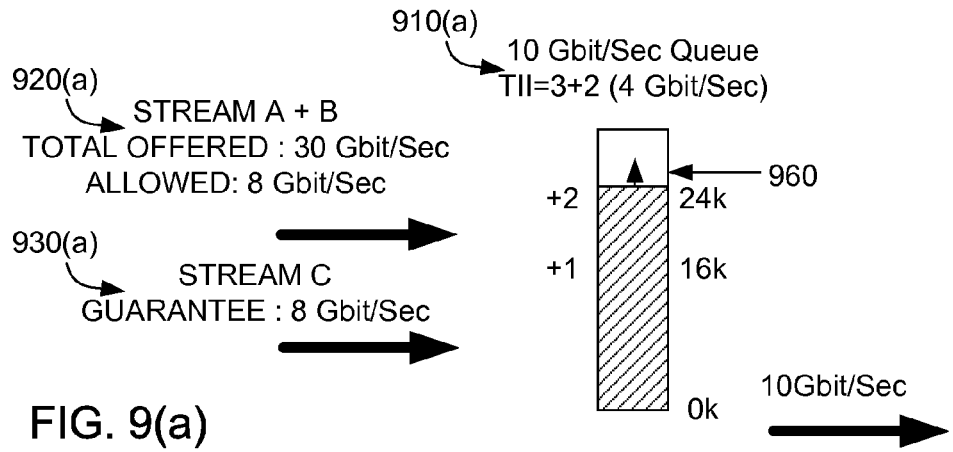
FIGS. 9(a-c) depict another example of output queue stabilization.
Figure 9B:
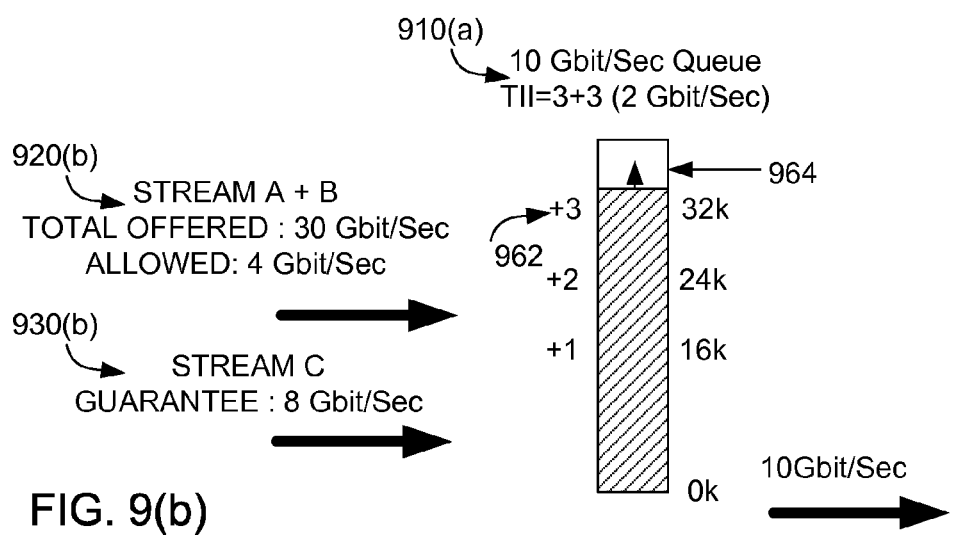
Figure 9C:
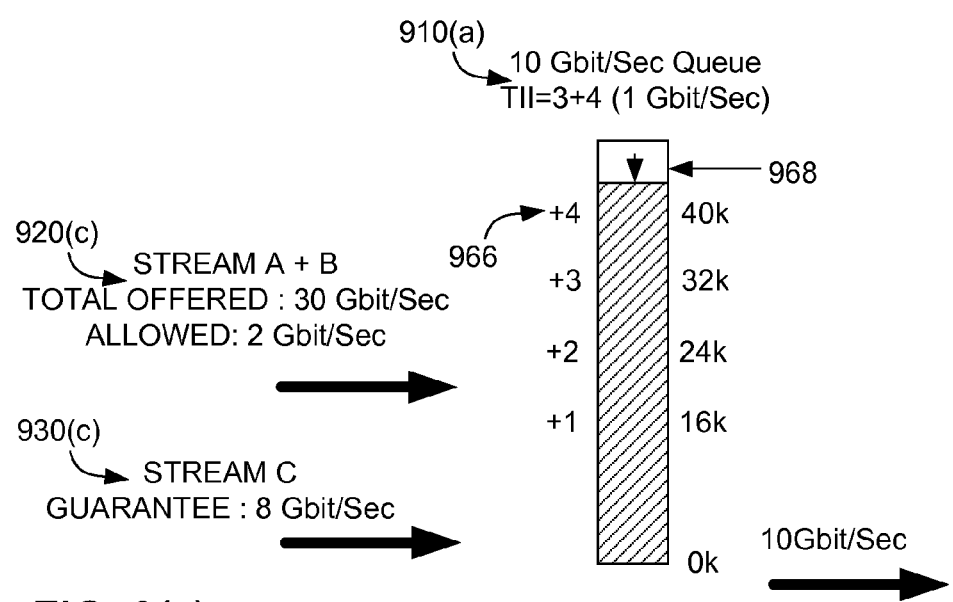

FIGS. 9(a-c) depict another example of output queue stabilization. FIG. 9 may be thought of as a continuation of FIG. 8, with the addition of a third stream. Just as above, output queue 910(a) may operate at 10 Gbit/sec. Continuing from FIG. 8, the TII value may be 5, resulting in communication of an allowed bandwidth of 4 Gbit/Sec per stream. For purposes of ease of description, Streams A and B have been shown as a combined stream 920(a), with a total offered date rate of 30 Gbit/sec. Based on the TII value currently in use, the output queue is requesting data at a rate of 4 Gbit/sec per stream, resulting in an allowed bandwidth of 8 Gbit/sec from the combination of Streams A and B.

A new stream, Stream C 930(a), may begin sending data to the output queue. However, Stream C may be a stream with a guaranteed bandwidth. As such, Stream C may ignore the TII value and send data at the rate that has been guaranteed. There are many reasons why a stream may be guaranteed a certain level of bandwidth, such as because the stream contains high priority traffic. Regardless of the reason why a stream is granted a guaranteed bandwidth, it should be understood that such a guarantee is a system administrator configured parameter.

As shown, Stream C 930(a) has a guarantee of 8 Gbit/sec and is sending data to the output queue at that rate. Because of the guarantee, Stream C does not limit the rate of traffic based on the current TII value. Because the total amount of data coming into the output queue is now 16 Gbit/sec (8 Gbit/sec from Streams A and B plus 8 Gbit/sec from Stream C), the depth of the output queue may begin to rise 960. At some point, the depth of the queue will rise past the next TII value transition point 962. As shown in FIG. 9(*b*), the output queue 910(*b*) will eventually rise past the 32 Kbyte point, resulting in a new TII value of 6, which results in an allowed data rate of 2 Gbit/sec per stream.

Accordingly, streams A and B 920(*b*) reduce their rate of data to 2 Gbit/sec each, resulting in an overall bandwidth of 4 Gbit/sec for those two streams. However, Stream C 930(*b*) has a guaranteed bandwidth of 8 Gbit/sec, and as such does not decrease the amount of data being sent to the output queue. This results in a total bandwidth entering the output queue of 12 Gbit/sec (4 Gbit/sec from Streams A and B and 8 Gbit/sec from Stream C). As the rate of data coming in is greater than the 10 Gbit/sec output rate of the queue, the output queue continues to grow 964.

The depth of the output queue 910(*c*) will eventually pass the next TII value transition point. As shown, the next transition point 966 at 40 Kbyte results in a TII value of 7, which results in a data rate of 1 Gbit/sec. Streams A and B 920(*c*) may conform to the new data rate and thus begin sending data at a combined rate of 2 Gbit/sec. Again, Stream C 930(*c*) is exempt from complying with the TII value due to the bandwidth guarantee. Stream C continues to send data at the 8 Gbit/sec rate, resulting in a combined rate from all three streams of 10 Gbit/sec. As this is the same as the data rate of the output queue, the queue will stabilize about this point 968.

The principles described with respect to FIG. 9 may also be applicable to other cases, such as setting an upper bound or a bias for a particular stream. For example, a system policy may be specified that a particular stream may only send request messages at a specified rate, regardless of the rate allowed by the output queue. For example, a policy may state that a stream should send request message at a rate corresponding to a TII of 5 or higher. Thus, the stream may send request messages at the specified TII value or greater, regardless of the TII value reported by the output queue, effectively putting a cap on the rate that the stream may send request messages.

A policy may also specify that a stream should be given a proportionally greater/smaller share of the available bandwidth. For example, a policy may specify that a given stream should be granted twice the bandwidth of all other streams. Thus, the stream may use a TII value that is one less than the TII requested by the output queue. Conversely, a stream that is to be granted half the share of the available bandwidth may add a value to the TII requested by the output queue. The techniques described above compensate for streams that do not comply with the requested TII.

Figure 10:
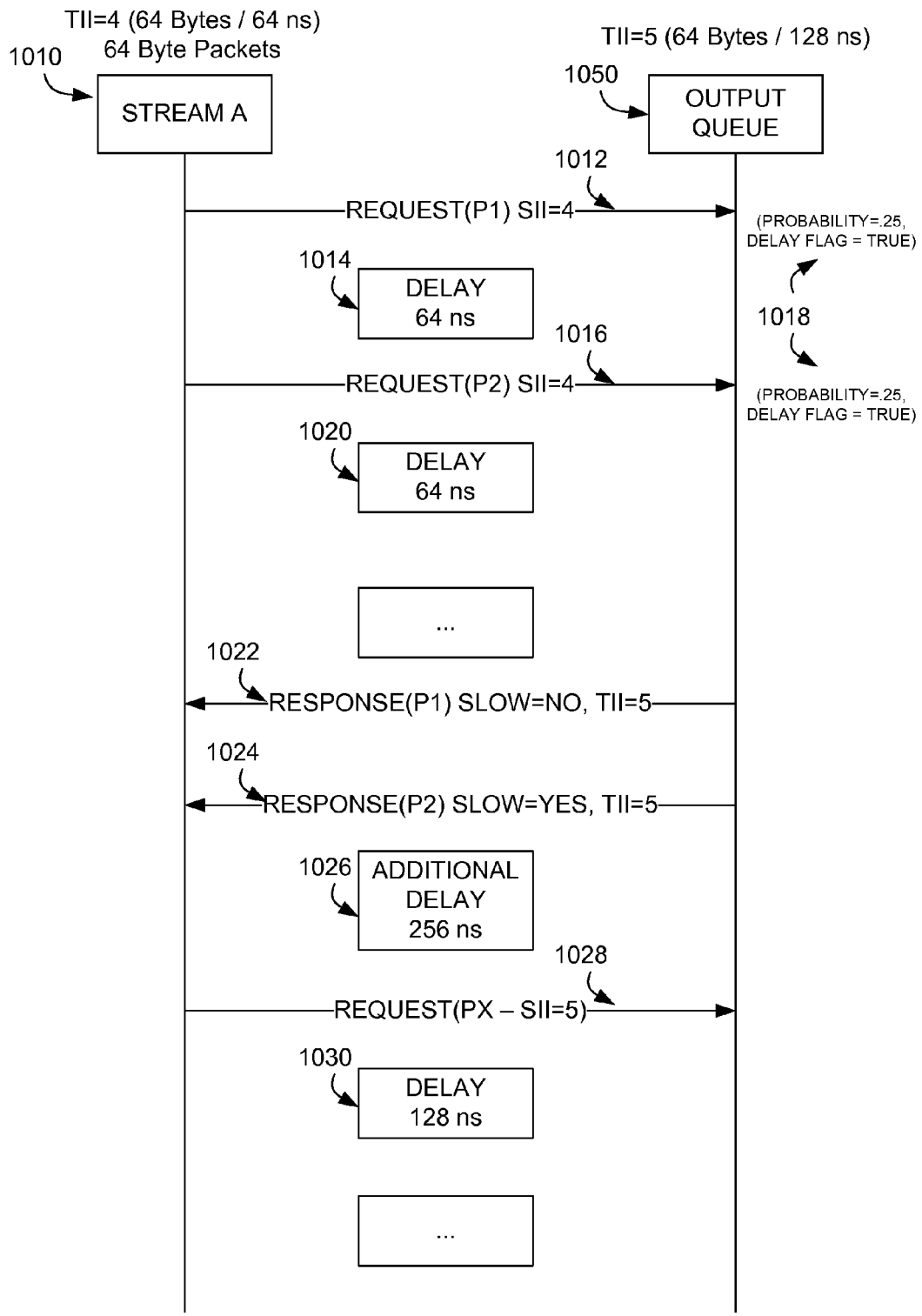
FIG. 10 is an example of a flow diagram for a delay corrective action.

FIG. 10 is an example of a flow diagram for a delay corrective action. As mentioned above, a source node may issue request messages at a rate determined by the TII for the target output queue. The TII value may be retrieved from a TII module on the source node. The TII module may be updated with the current TII value for an output queue based on a TII value that is included in a response message. However, with small packet sizes, it is possible that the TII value used when issuing a request message is not the current TII value of the output queue due to the small delay between sending request messages and the relatively longer delay for receiving a response message. For example, many request messages using a given TII value may be sent before a response indicating the current TII value is received.

As shown in FIG. 10, Stream A 1010 may be a stream of 64 Byte packets. The TII for the output queue that is the destination for the data packets of stream A may be 4 which implies a delay of 64 ns per 64 Bytes of data in a data packet. Thus, with 64 Byte data packets, the delay between requests is 64 ns. As shown, stream A may send a request message 1012 for packet ID P1 to an output queue. Included in the request message may be the Stated Issue Interval. As mentioned above, the SII is the TII that was retrieved from the TII module at the time the request message was sent. This is not necessarily the current TII that is in effect for the output queue. As shown, the output queue 1050 may currently be operating with a TII of 5, based on the current queue depth. As should be clear, there is a mismatch in the rate at which request messages are being sent and the rate at which the output queue wishes to receive request messages.

Stream A may then delay a period of time based on the TII and the size of the data packet identified in the request message. In the example shown in FIG. 10, with a TII value of 4 (64 ns/64 Bytes) and a packet size of 64 Bytes, the delay may be 64 ns. Stream A may then delay 64 ns 1014 prior to sending the next request message. Once the period of delay is completed, stream A may send the next request message 1016 for data packet P2. Again, included in the request message may be the SII of 4, which is the current TII value from the perspective of the source node, as no response has yet been received to change the TII value. The stream may again insert a delay of 64 ns 1020

When the request message 1012 is received by the output queue 1050, the output queue may determine if the SII included in the request message is greater than the TII currently in effect for the output queue. If the SII is equal to or less than the TII, there is no need for corrective action of any type, as Stream A is issuing request messages, and hence offering data, at a rate that is less than that which is desired by the output queue. However, if the SII is greater than the TII currently in effect for the output queue, this means that Stream A is issuing request messages offering data at a rate that exceeds that which is desired by the output queue. As explained above, if a stream does not conform the rate at which it offers data to the rate desired by the output queue, the output queue may fill too fast and eventually overflow due to insufficient space in the output queue.

In order to overcome this problem, the output queue may instruct stream A to take corrective action by inserting a delay prior to sending the next request message. The output queue may determine if the depth of the output queue is below a regulation threshold. If the depth of the output queue is below a regulation threshold, there is no need to take any type of corrective action. Likewise, the output queue may determine if the depth of the output queue is above a refuse everything threshold. If so, the corrective action that may be taken is to refuse the request message. The request message may be sent again at a later time. Request message refusal will be described in further detail with respect to FIG. 11.

If the output queue is not operating in the unregulated or refuse everything portions of the output queue, and the SII is greater than the TII, the output queue may retrieve a probability 1018 of taking corrective action from the probability data structure. As mentioned above, given an SII value, a TII value, and a packet size, a tuple may be retrieved from the probability data structure. The tuple may specify the probability of taking corrective action and if that corrective action is to be a delay. For purposes of description of FIG. 10, assume the corrective action is to be a delay, such that the delay flag is set to true.

The output queue may generate a random number whose value may lie between 0 and 1. This random value may then be compared to the probability that was retrieved from the probability data structure. If the random number is less than the probability specified, corrective action may be taken. However, if the probability is greater than the retrieved probability, no corrective action may be taken. As shown, when request message 1012 was received, the probability determination above may have been made. For purposes of description, assume that the comparison determined that there would be no corrective action. As such, the response message 1022 indicates that no corrective action is to be taken as shown by the Slow field equaling No. It should be noted that the response message also includes the current TII value. Thus, the source node is made aware of the current TII value for the output queue and may store this value. The source node may use the stored TII value for future request messages.

When request message 1016 is received by the output queue, the same determination described above may be performed. However, for purposes of explanation, assume that this time the random number was chosen such that the probability of taking corrective action indicates that corrective action should be taken. It should be noted that the probability retrieved for processing the request 1016 is the same as that retrieved above 1018. This should be clear because the TII, SII, and packet size were the same for both packets P1 and P2.

The output queue may then send a response message 1024 to the source node indicating that corrective action should be taken. As shown, the slow field in the response message is set to yes, indicating to Stream A that an additional delay should be inserted prior to sending the next request message. Stream A may then insert an additional delay 1026, shown here as 256 ns, prior to sending the next request message. Determining how much time to delay will be described in further detail below. After the additional delay, Stream A may send the next request message 1028 for the next packet PX in the stream. It should be noted that the variable X is used to denote the next packet because any number of request messages may have been sent between sending request message 1016 and the receipt of response message 1022. Thus, the additional delay is inserted prior to sending the next request message, regardless of which data packet is referenced in the request. The stream may then delay a time period as determined by the current TII value 5 and the size of the data packets. As shown, the delay for a 64 Byte data packet with a TII of 5 is 128 ns 1030. After the delay has completed, the next request message may be sent, and the process repeated.

The amount of time to delay may be variable based on factors such as the size of the data packet and the TII that is currently in effect at the output queue. Although the delay value may be variable, it is deterministic, meaning that given a size of a data packet and a current TII value, the same delay will result. As such, the source node has sufficient information to compute the delay value because the response message includes the packet ID, which in turn identifies the data packet that was identified in the request message. Furthermore, the current TII value is included in the response message. The delay value may be a function of the size of the data packet and the current TII value. For example, the delay may be twice the inter request delay that would result from a packet of a given size and the current TII interval. For example, as shown, the packet size is 64 Bytes. With a TII value of 5, the inter request delay is 128 ns and twice the inter request delay is 256 ns.

The probability computed and stored in the probability data structure may be such that if a set of request messages are received with a SII greater than the current TII, and an additional delay inserted as described above, would result in the data rate requested by the output queue. For example, if the current TII value for an output queue is 5, the output queue desires request messages be sent at a rate of 64 bytes/128 ns. Given 64 Byte packets, this means that the output queue desires a request for one packet every 128 ns. The stream may be issuing request messages at a rate corresponding to a TII of 4, which implies a rate of 64 Bytes/64 ns. Thus, the stream may be sending requests at a rate of 1 request every 64 ns.

If the additional delay to be inserted is twice the inter request delay, as described above for 64 Byte packets and a TII value of 5, the additional delay would be 256 ns. To determine the probability to be used when determining if a correction should be made by inserting a delay, a calculation may be performed to determine the number of packets that should be accepted with no additional delay for each packet for which a delay is instituted. For example, if 100 requests are sent with a inter request delay of 128 ns, this results in 100 packets in 12,800 ns. The same 100 packets sent with a TII value of 4, which implies an inter request delay of 64 ns results in 100 packets in 6,400 ns. Given the additional delay value of 256 ns described above, in order for the two streams of requests to be equal, there would need to be the addition of 25 additional delays (12,800 ns=6,400 ns+25*256 ns). Thus, over the long term, inserting additional delays with a probability of 25 delays/100 packets (0.25) results in an offered data rate that would, over the long term, be equal to the desired rate. Thus, if a delay is inserted with a probability of 0.25, with 64 byte packets, a TII of 5, and a SII of 4, and an additional delay of twice the inter request delay at the current TII value, the resulting rate of request messages should, over the long term, be equivalent to issuing request messages at the current TII value.

Although a specific example of calculating the probabilities based on a the SII, TII, packet size, and a specific value for an additional delay was described above, it should understood that the process described above may be repeated for all TII and SII values (or differences between them), packet sizes, and specific values for additional delays. The probabilities may typically be computed in advance and stored in the probability data structure, such that the complexities of calculation of the probabilities need not be performed upon receipt of every request message. The probability may simply be retrieved from the probability data structure and used as was described above.

Figure 11:
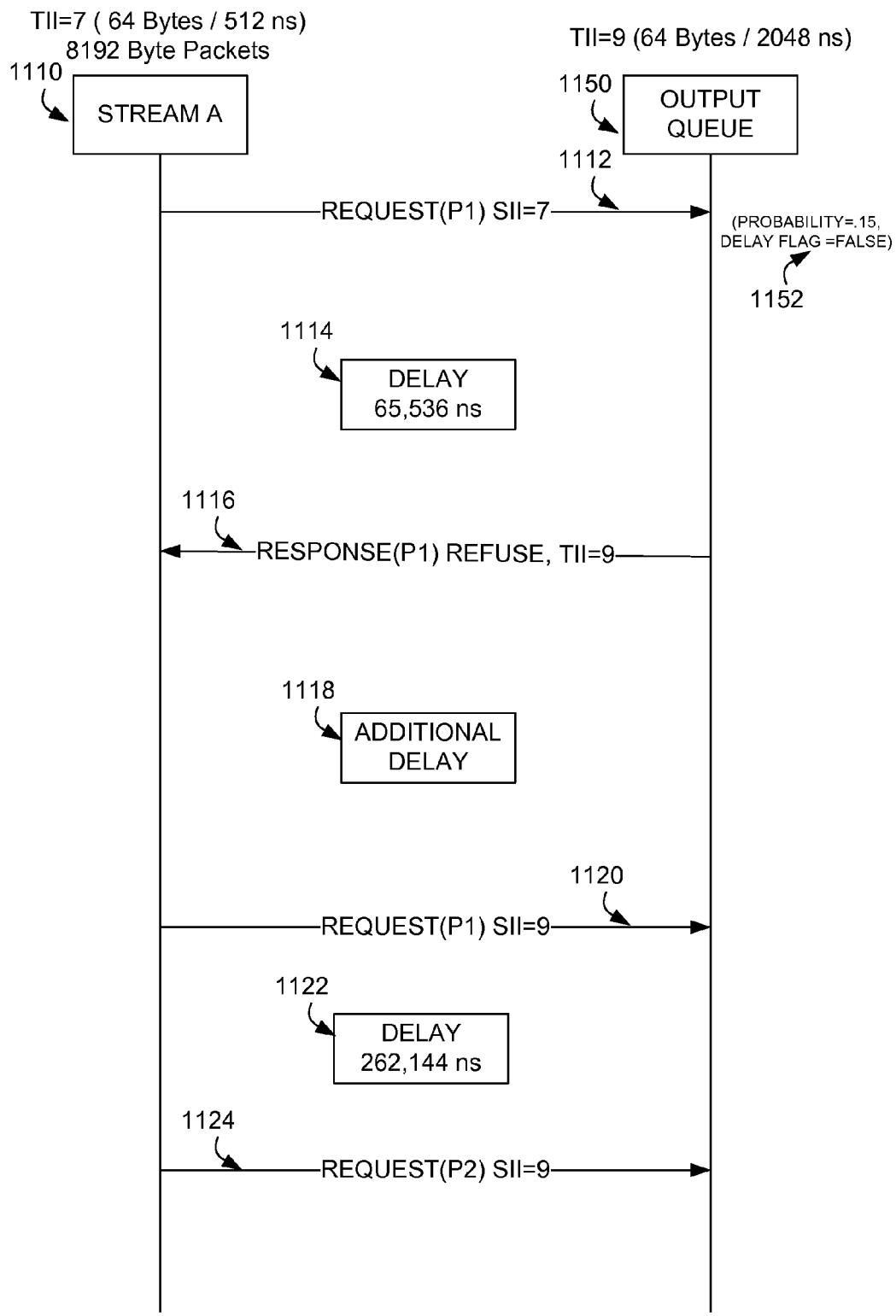
FIG. 11 is an example of a flow diagram for a refuse corrective action.

FIG. 11 is an example of a flow diagram for a refuse corrective action. Although the techniques described with respect to FIG. 10 may be used to correct mismatches between the SII and TII, the correction described above may not always work for all sizes of data packets and differences between SII and TII. Depending on the packet size, SII, TII, and the additional delay to be added, it is possible that the number of delays needed per 100 requests exceeds 100. As such, the probability of inserting a delay would exceed 1. Because the mechanism described above may insert one delay per request, it would not be possible to insert more delays than requests received. Furthermore, the mechanism described above may still accept the data packet and only adding an additional delay may be insufficient to ensure that the normal regulation of other traffic is not disturbed.

For example, in the mechanism described above, the request message may be accepted and an additional delay inserted. The data packet may arrive at the destination node, as described above. However, the arrival of the data packet may cause the output queue to exceed the refuse all packets threshold, resulting in the indiscriminate refusal of all future request messages. Such indiscriminate refusal may be a problem at least for the reasons described above. In addition, the arrival of the data packet may cause a large change in the depth of the output queue, possibly resulting in a more restrictive TII. The more restrictive TII may penalize other traffic by limiting the rate at which other streams may offer data.

To overcome the problems described above, a second type of corrective action may be implemented. Rather than inserting an additional delay, a request message may simply be refused with a certain probability. The probability may be determined such that if, over the long term, request message are refused with the specified probability, the resulting rate of request messages will be roughly equivalent to the desired rate.

FIG. 11 is similar to FIG. 10. A stream A 1110 may be a stream of packets that are each 8192 Bytes long. The TII value stored at the source node may indicate the current TII is 7, implying a request rate of 1 packet every 65,536 ns (8192 Bytes*512 ns/64 Bytes). The stream A may send a request message 1112 for packet P1 to an output queue 1150. The stream A may then initiate a delay 1114 prior to sending the next request message. For purposes of this description, it should be assumed that the output queue is not operating in the unregulated or refuse everything depths. The output queue 1150 may retrieve a probability 1152 from the probability data structure that was described above.

The retrieved probability tuple may indicate a probability at which corrective action should be taken. As explained above, a random number between 0 and 1 may be generated, and the random number compared to the retrieved probability. Based on this comparison, corrective action may be taken. For purposes of this description, assume that the random number indicates that corrective action is to be taken. As such, the output queue may send a response message indicating that corrective action is to be taken. As shown, the response message 1116 includes an indication that the request message is to be refused. Although the response message 1116 is shown as being received after the delay 1114, it should be understood that the response message may actually be received during the period of delay 1114. Also included in the response message may be the current TII in effect for the output queue. The source node may use this TII value to update the TII values stored in the TII module. The stream may resend the request message at a later time, as will be described further below.

Once the response message 1116 is received, the stream may insert an additional delay 1118. Just as above, the additional delay may be variable, but deterministic, meaning that given a packet size and a current TII value, the same delay can be computed. For example, the additional delay may be half the inter packet request delay for a packet of the size of the packet that was refused at the current TII value. As shown, the packet size is 8192 Bytes and the current TII is 9, resulting in an inter packet request delay of 262,144 ns. Half of this would be 131,072 ns. The purpose of the additional delay is to ensure that the refusal has a predictable regulatory effect.

At this point, the source node may have stored the current value for the TII, as the value was received in the response message 1116. The stream may then resend the request message that was refused. The request message may be resent after the additional delay 1118 has completed. As shown, the request 1120 for packet P1 may be resent. The SII value included in the request message may indicate the TII value that was included in the response message indicating refusal. The stream may then delay a period of time 1122 as specified by the TII value and the size of the data packet. Given a TII value of 9 as shown, and a packet size of 8192 Bytes, the delay 1122 may be 262,144 ns. After the period of delay has completed, the stream may send the next request message 1124, which in this case is the request message for packet P2. The delay/request process may then repeat.

In some example implementations, the probabilities for refusing a request message may be a configurable parameter. Thus, the probability at which requests are refused may be modified based on actual performance of the networking device. If the desired performance is not achieved, the parameters may be modified until the desired performance characteristics are achieved. The reason that the probabilities may be configurable is that it may not be possible to simply calculate a probability as was done above with respect to adding additional delays, due to the large number of factors that are needed to determine the proper probabilities.

In some example implementations, the probabilities for refusing a request may be determined using a successive approximation technique. The system may be modeled to include all of the factors that are in play when refusing a data packet. Some examples of the factors may include the size of the packet, the SII, the TII, the round trip latency for sending a request and receiving a response through the switch fabric, the length of the delay incurred following a refusal, and other factors. A mathematical model may be derived and the various probabilities may be tested. For example, for each SII, TII, and packet size, a simulation may be run using the model with a given probability. The result of the simulation may be the effective rate at which request messages are accepted, which in turn determines the rate at which data packets are offered to the output queue. If the effective rate is less than the desired rate, the simulation may be rerun with a lower probability. If the effective rate is greater than the desired rate, the simulation may be rerun with a higher probability.

The simulation may be rerun until the effective rate approximately equals the desired rate. The probability that achieves this result may then be entered into the probability data structure for the particular combination of TII, SII, and data packet size. The process described above may be executed for all possible combinations of TII, SII, and data packet sizes, thus allowing for population of the probability data structure. As a simple example, selecting a probability of zero results in no packets being refused. As such, the effective rate at which request messages are sent is equal to the SII, which is less than the current TII. At the other extreme, a probability of one indicates that all request messages are refused, resulting in an effective rate of zero, as all request messages are refused. The successive approximation technique described above may be used to focus in on the specific probability that results in the desired effective request rate, based on the SII, TII, and packet size.

Figure 12:
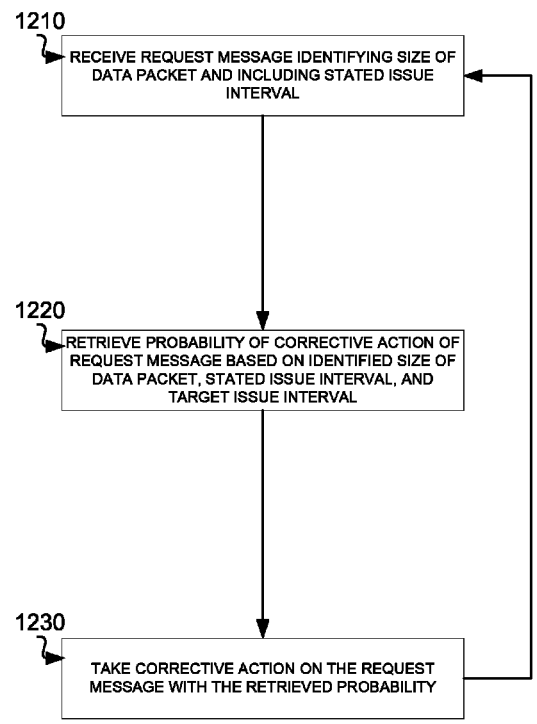
FIG. 12 is an example of a high level flow diagram for probabilistic correction by a destination node.

FIG. 12 is an example of a high level flow diagram for probabilistic correction by a destination node. In block 1210 a request message may be received. The request message may identify the size of a data packet. The request message may also include a stated issue interval. Thus, the request message may include the information necessary to retrieve a correction probability from a data structure such as the ones described with respect to FIG.

In block 1220 a probability of corrective action may be retrieved. For example, the probability may be retrieved from a data structure such as the ones depicted in FIG. 5. The probability may be retrieved based on the identified size of the data packet in the request message, the Stated Issue Interval in the request message, and the Target Issue Interval for the output queue that was the target of the request message. In block 1230 corrective action may be taken on the request message with the retrieved probability. In other words, the probability retrieved in block 1220 may be used to determine if corrective action is taken. In block 1230, that corrective action is taken based on the probability that corrective action is to be taken.

Figure 13:
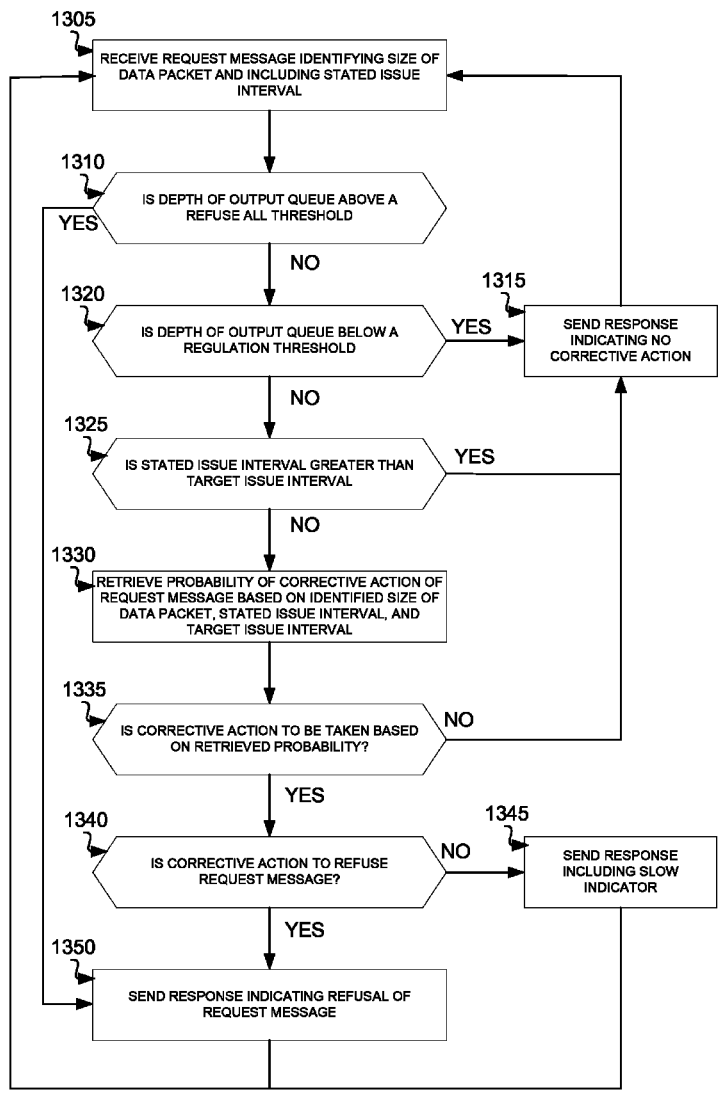
FIG. 13 is another example of a high level flow diagram for probabilistic correction by a destination node.

FIG. 13 is another example of a high level flow diagram for probabilistic correction by a destination node. In block 1305 a request message may be received. The request message may identify the size of a data packet. The request message may also include a stated issue interval. Thus, the request message may include the information necessary to retrieve a correction probability from a data structure such as the ones described with respect to FIG. 5. In block 1310 it may be determined if the depth of the output queue is above a refuse all requests threshold. If so, the probability of correction is 100 percent, and the type of correction is to refuse the request. The process moves to block 1350, which is described in further detail below. The process moves to block 1315 wherein a response to the request message is sent indicating that no corrective action is to be taken.

In block 1320 it may be determined if the depth of the output queue is below a regulation threshold. As mentioned above, below a certain threshold, there is no need to regulate the rate at which request messages are sent. If the output queue is below this threshold, the process moves to block 1315, wherein a response indicating no corrective action is sent. In block 1310, it may be determined if the Stated Issue Interval is greater than the Target Issue Interval. If so, this may mean that no corrective action is to be taken, as corrective action may be taken when the SII exceeds the TII.

In block 1330 a probability of corrective action may be retrieved based on the identified size of the data packet, the Stated Issue Interval, and the Target Issue Interval. As mentioned above, the retrieved probability may determine the probability of any type of corrective action being taken, as well as the type of corrective action. In block 1335, it may be determined if corrective action is to be taken based on the retrieved probability. For example, a random number may be selected and compared with the retrieved probability. If the comparison indicates that no correction should be performed, the process moves to block 1315.

In block 1340 it may be determined if the type of corrective action to take is to refuse the request message. If so, the process moves to block 1350. In block 1350, a response message indicating that the request message has been refused may be sent to the source node. The source node may resend the request message at a later period in time. If the corrective action to be taken in block 1340 is not to refuse the request message, the process moves to block 1345. In block 1345 a response including a slow indicator is sent to the source node. The source node may then insert a delay prior to sending a subsequent request message.

Figure 14:
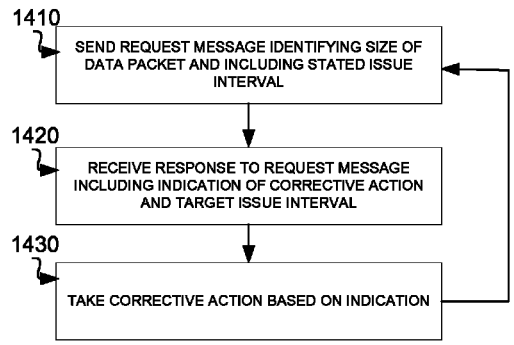
FIG. 14 is an example of a high level flow diagram for probabilistic correction by a source node.

FIG. 14 is an example of a high level flow diagram for probabilistic correction by a source node. In block 1410 a request message may be sent by a source node. The request message may identify a size of a data packet and also include a Stated Issue Interval. As mentioned above, the SII may be the TII that was in effect at the time the request message was sent. In block 1420, a response to the request message may be received. The response may include an indication of the need to take corrective action and a Target Issue Interval. In block 1430, corrective action may be taken based on the indication.

Figure 15:
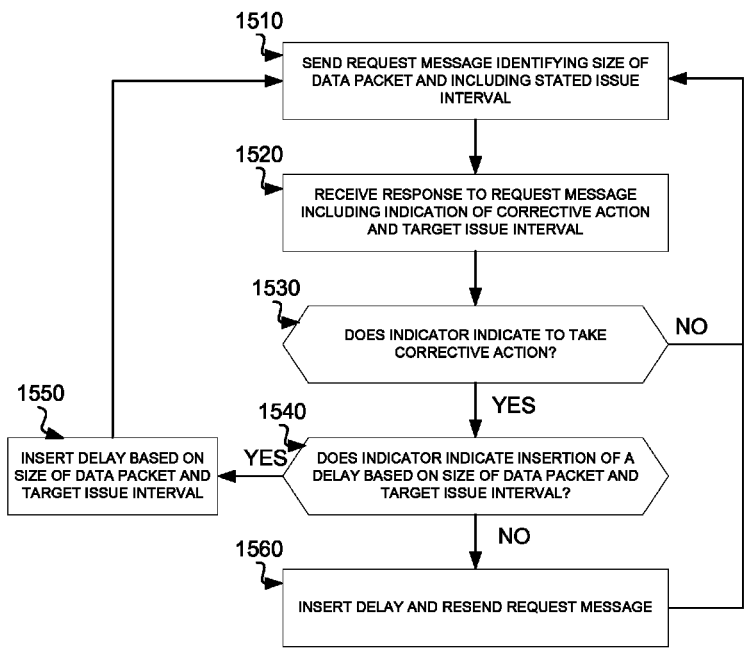
FIG. 15 is another example of a high level flow diagram for probabilistic correction by a source node.

FIG. 15 is another example of a high level flow diagram for probabilistic correction by a source node. In block 1510 a request message may be sent by a source node. The request message may identify a size of a data packet and also include a Stated Issue Interval. As mentioned above, the SII may be the TII that was in effect at the time the request message was sent. In block 1520, a response to the request message may be received. The response may include an indication of the need to take corrective action and a Target Issue Interval.

In block 1530 it may be determined if the indication indicates that corrective action is to be taken. In many cases, no corrective action is needed, and as such the indication for corrective action so indicates. Thus, no corrective action is taken. If corrective action is indicated in block 1530, the process moves to block 1540. In block 1540 it may be determined if the indication indicates insertion of a delay based on the size of the data packet and the Target Issue Interval. If so, the process moves to block 1550. In block 1550, a delay may be inserted based on the size of the data packet and the Target Issue Interval. In block 1560, the corrective action was determined to be refusal of the request message. As such, a delay may be inserted and the same request message that was sent in block 1510 may be resent to the destination node.

We claim:

1. A method comprising:
   receiving, at a destination node, a request message identifying a size of a data packet and including a stated issue interval;
   retrieving a probability of correction of the request message based on the identified size of the data packet, the stated issue interval, and a target issue interval;
   taking corrective action on the request message with the retrieved probability.

2. The method of claim 1 wherein retrieving the probability of correction is based on the difference between the stated issue interval and the target issue interval.

3. The method of claim 2 further comprising:
   determining a type of corrective action based on the retrieved probability.

4. The method of claim 3, wherein the type of corrective action is to initiate a delay, further comprising:
   including a slow indicator in a response sent to a source node, wherein the source node inserts the delay prior to sending a subsequent request message when the response including the slow indicator is received.

5. The method of claim 3, wherein the type of corrective action is to refuse the request message, further comprising:
   including a refused indicator in a response sent to a source node, wherein the source node inserts a delay and resends the request message at a later time.

6. The method of claim 3 wherein the probability of taking corrective action is zero if the stated issue interval is less than the target issue interval.

7. The method of claim 3 wherein the probability of taking corrective action is zero if a depth of an output queue that received the request message is below a regulation threshold.

8. The method of claim 3 wherein the probability of taking corrective action is one hundred percent if a depth of an output queue that received the request message is above a refuse all request threshold, wherein the corrective action is to refuse the request message.

9. The method of claim 4 wherein the delay is based on the target issue interval and the size of the data packet.

10. A method comprising:
    sending, from a source node, a request message identifying a size of a data packet, the request message further including a stated issue interval;
    receiving a response to the request message including an indication of corrective action and a target issue interval, wherein the indication of corrective action is based on a probability retrieved using a target issue interval, the stated issue interval, and the size of the data packet; and
    taking corrective action based on the indicator.

11. The method of claim 10, wherein the corrective action indication indicates insertion of a delay, further comprising:

inserting a delay based on the size of the data packet and the target issue interval.

12. The method of claim 10, wherein the corrective action indication indicates refusal of the request message, further comprising:
    inserting a delay; and
    resending the request message.

13. A device comprising:
    a probability module to maintain probabilities of taking corrective action based on a size of a data packet, a stated issue interval, and a target issue interval; and
    a response module to receive request messages including the size of the data packet and the stated issue interval, and determine if corrective action is taken based on the size of the data packet, the stated issue interval, and a target issue interval and the maintained probabilities, wherein the response module sends a response message to a source node indicating if corrective action is to be taken.

14. The device of claim 13 wherein the corrective action is insertion of a delay by the source node prior to the source node sending a subsequent request message.

15. The device of claim 13 wherein the corrective action is refusal of the request message.

* * * * *